Figure 1:
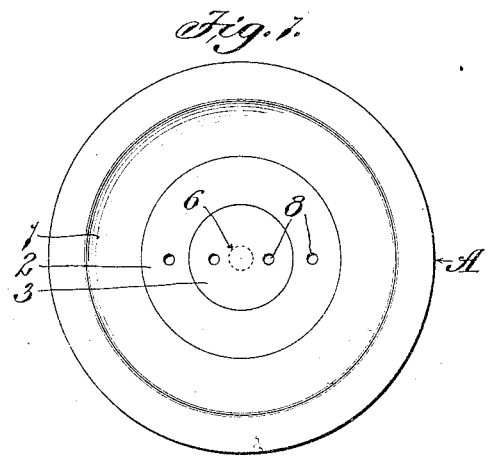

G. D. POGUE.
PISTON FOR INTERNAL COMBUSTION ENGINES.
APPLICATION FILED NOV. 17, 1916.

1,229,133.

Patented June 5, 1917.

Inventor,
George D. Pogue.
By Bakewell & Cornwell Attys.

BEST AVAILABLE COP'

UNITED STATES PATENT OFFICE.

GEORGE D. POGUE, OF ST. LOUIS, MISSOURI.

PISTON FOR INTERNAL-COMBUSTION ENGINES.

1,229,133.      Specification of Letters Patent.      Patented June 5, 1917.

Application filed November 17, 1916. Serial No. 131,893.

*To all whom it may concern:*

Be it known that I, GEORGE D. POGUE, a citizen of the United States, residing at St. Louis, Missouri, have invented a certain new and useful Improvement in Pistons for Internal-Combustion Engines, of which the following is a full, clear, and exact description, such as will enable others skilled in the art to which it appertains to make and use the same.

This invention relates to pistons for internal combustion engines.

In internal combustion engines, particularly Diesel engines of relatively large capacity, requiring pistons of twenty inches or more in diameter, it has been found that the top or head of the piston, which is exposed directly to the heat of combustion, is liable to fissure or crack sufficiently to allow the high pressure gases to leak through the piston, and thus impair the operation of the engine, this tendency being particularly noticeable in engines which are started and stopped at relatively frequent intervals, such, for example, as an engine that is operated eight or ten hours each day and allowed to cool off completely each night.

In my opinion this is caused by the unequal expansion and contraction of the central portion and the peripheral portion of the top of the piston when the engine is in operation and when the piston is cooling off. It is a well known fact that the central portion of the top of the piston becomes much hotter than the peripheral portion of the top when the engine is in operation, due partly to the fact that the water-cooled side wall of the cylinder continuously abstracts heat from the peripheral portion of the piston top, and partly to the fact that the fuel is sprayed directly against the central portion of the top of the piston, during the operation of introducing the fuel into the cylinder. The peripheral portion of the piston top, owing to its low temperature, does not expand as much as the central portion or hot zone which it surrounds, and consequently, under certain conditions, said peripheral portion or relatively cooler zone is frequently enlarged or stretched beyond the yielding point by the greater expansion of the central portion of the piston top. When the temperature of the piston is decreased, due either to stopping the engine or a reduction in the load, the metal in the top shrinks and contracts, but, in view of the fact that the peripheral portion has been actually stretched or enlarged, it cannot resume its former dimensions. The result is, that in cooling off cracks or fissures form in the top of the piston, due to the strains set up in the metal by the central portion pulling away from the peripheral portion which was enlarged or stretched beyond the yielding point, following the starting of the engine or an increase in the load. It naturally follows that the greater the diameter of the piston, the greater these differentials in expansion and contraction become and the greater the liability to fissure or crack. Another undesirable result of this distortion of the top of the piston is that the piston rings are clamped so tightly in their grooves that the top ring, or even two or three of the rings at the upper end of the piston, are rendered inoperative.

The main object of my invention is to provide a piston which is so constructed that the top or head of same is not liable to crack or fissure. To this end I have devised a piston in which the top or head is composed of a plurality of parts or sections that are combined in such a manner that they are free to expand and contract independently of each other without liability of injuring the piston or permitting the high pressure gases to escape through the piston.

Another object is to provide a piston whose top or head is composed of a plurality of independently movable sections that are held in intimate contact with each other, partly by the pressure existing in the cylinder, and partly by a resilient means that clamps said sections tightly together.

Another object is to provide a piston of the character just referred to, which is so constructed that the coöperating surfaces on the sections of the top can be readily ground together and rendered gas tight. Other objects and desirable features of my invention will be hereinafter pointed out.

My invention is applicable to pistons in which the head is formed integral with the skirt and to pistons in which the head and skirt portions are detachably connected together.

Figure 1 of the drawings is a top plan view of a piston constructed in accordance with my invention.

Figure 2:
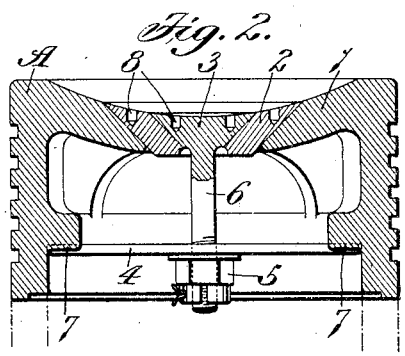
Figure 3:
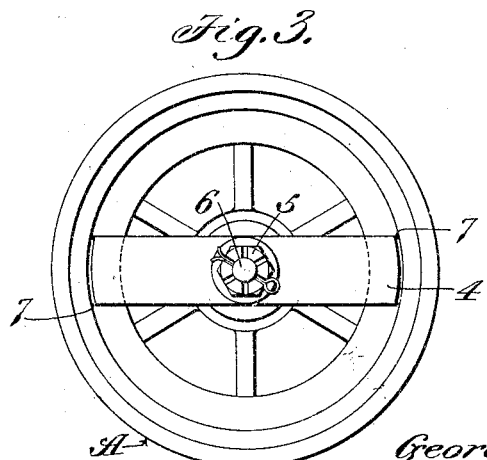

Fig. 2 is a vertical cross-sectional view of the head of the piston, the skirt portion of the piston not being shown; and Fig. 3 is a bottom plan view of said head.

Referring to the drawings, which illustrate the preferred form of my invention, A designates a piston head whose top wall is composed of a plurality of sections or parts which are so shaped and combined that they form an imperforate top wall whose central portion is free to expand without causing the peripheral portion of the top of the piston to be enlarged or stretched beyond the yielding point. In the form of my invention herein shown the head A of the piston is provided with an integral part 1 that forms the peripheral portion of the top of the piston, and the central portion or hot zone of the piston top is composed of an annular section 2 that fits snugly in an opening in the part 1 and a center section 3 that fits snugly inside of the annular section 2. The opening in the part 1 is tapered or beveled, as shown in Fig. 2, and the periphery of the annular section 2 is tapered so that it will fit snugly in said opening. The center opening in the annular section 2 is also beveled or tapered, and the center section 3 is so shaped that it will fit snugly inside of same. By forming the sections 1, 2 and 3 of the top in this manner I am able to readily grind the coöperating surfaces of same together, so as to produce gas tight joints between said parts; and another desirable feature of such a construction is that the pressure that exists in the cylinder tends to hold the sections or parts of the top of the piston in intimate contact with each other. Means is provided, however, for securely clamping the sections 1, 2 and 3 together, and while various means may be used for this purpose, I prefer to use a resilient member, preferably a flat spring 4, that coöperates with a nut 5 on an externally screw-threaded extension 6 on the center section 3, to draw said center section downwardly, and thus cause it to securely clamp the intermediate section 2 against the outer section 1, said spring 4 being arranged transversely of the head A on the underside of an annular rib 7 on said head, as shown in Figs. 2 and 3. If desired, the center section 3 and the intermediate section 2 can be provided with recesses 8, in which a spanner wrench can be inserted, so as to rotate said sections when it is desired to grind the joints between same and thus make said joints gas tight.

With a piston of the construction above described there is no liability of the top of the piston cracking, owing to the fact that said top is constructed in such a manner that the central portion of same can expand without stretching or enlarging the peripheral portion beyond the yielding point, and can contract or shrink without creating strains in the top which tend to crack same. When the engine is in operation the center section 3 and the intermediate section 2, due to their relatively high temperature, expand more than the relatively cooler peripheral section 1, but, in view of the fact that the contacting surfaces of said sections are beveled, said center section 3 and intermediate section 2 are free to move upwardly relatively to the peripheral section 1 without exerting any bursting strains or radial strains on said peripheral section. Thereafter, when the piston cools off, the center section and intermediate section resume their former dimensions and position. It is immaterial, so far as my broad idea is concerned, how many sections are used to form the top of the piston, and it is also immaterial what means is employed to clamp said sections together.

I am aware of the fact that it is old to equip the top of a piston with a center plug formed of the same kind of metal as the top or of a different metal, which plug is rigidly connected to the top of the piston by being taper threaded into same, but such pistons have not proved satisfactory, on account of the tendency of the gases to leak around the plug.

My improved piston is distinguished from a piston of the type just referred to, in that the top is composed of a plurality of relatively movable, concentrically arranged sections, and further, in that the various sections constituting the top are yieldingly held together and are free to expand and contract without causing the metal in any of said sections to be subjected to abnormal stresses or strains.

Having thus described my invention, what I claim, and desire to secure by Letters Patent, is:

1. A piston for internal combustion engines provided with a top composed of a plurality of sections which are free to expand and contract without creating strains in the metal from which said sections are formed.

2. A piston for internal combustion engines having a top composed of a plurality of concentrically arranged sections, the center section being imperforate.

3. A piston for internal combustion engines having a top composed of a plurality of concentrically arranged sections provided with beveled contacting surfaces.

4. A piston for internal combustion engines having a top composed of a plurality of concentrically arranged sections, fitted one within the other and constructed in such a manner that the pressure in the cylinder forces said sections into intimate contact with each other, the top faces of said sections being substantially flush with each other.

5. A piston for internal combustion engines having a top whose peripheral portion is provided with a tapered seat, an imperforate member in said seat that forms part of the top of the piston, and a resilient means for holding said member seated.

6. A piston for internal combustion engines having a top that comprises a plurality of sections arranged in approximately nested relation and ground together, the center section being imperforate.

7. A piston for internal combustion engines having a top composed of a plurality of concentrically arranged sections, each of which has a smooth beveled seat that receives the section which it surrounds.

8. A piston for internal combustion engines having a top composed of a plurality of concentrically arranged sections, each of which has a smooth beveled seat that receives the section which it surrounds, and a resilient means for clamping said sections together.

9. A piston for internal combustion engines having a top that comprises a plurality of concentrically arranged sections provided with coöperating ground beveled surfaces, the top faces of said sections being substantially flush with each other and the center section being imperforate, a depending portion on the center section, and a resilient means that coöperates with said depending portion to clamp said sections together.

10. A piston for internal combustion engines having a top whose peripheral portion is integrally connected to the piston and whose central portion is free to move relatively to said peripheral portion when the metal in the same expands and contracts.

11. A piston for internal combustion engines having a top whose peripheral portion is integrally connected to the piston and whose central portion is free to move relatively to said peripheral portion when the metal in the same expands and contracts, said portions being separated from each other by ground gas tight joints.

12. A piston for internal combustion engines having a top whose peripheral portion is integrally connected to the piston and whose central portion is free to move relatively to said peripheral portion when the metal in the same expands and contracts, said portions being separated from each other by ground gas tight joints, and resilient means for holding said portions together.

13. A piston for internal combustion engines whose top comprises a peripheral portion that is integrally connected to the piston, a central portion comprising a plurality of independently movable sections carried by said peripheral portion and fitted one within the other, and a resilient means that holds said sections together and also in operative position with relation to the peripheral portion of the top.

GEORGE D. POGUE.